Aug. 22, 1967　　　F. J. RUSSELL　　　3,337,249
TRAILER LOCK
Filed April 4, 1966
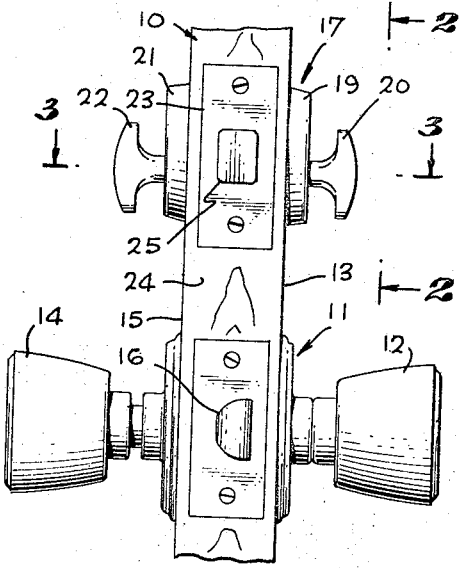
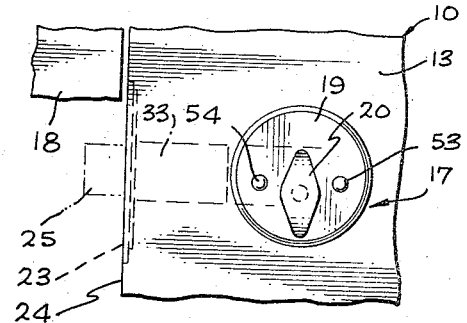
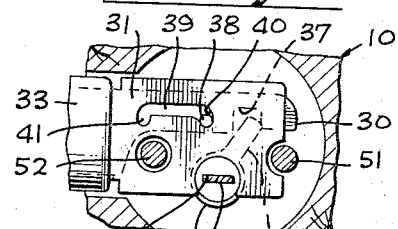
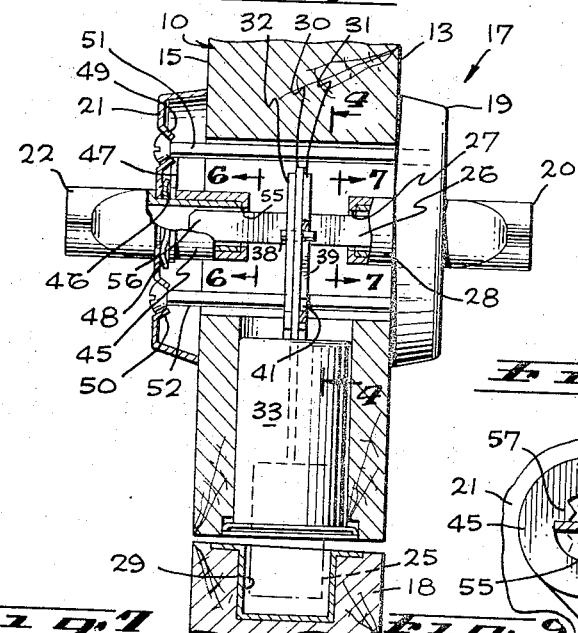
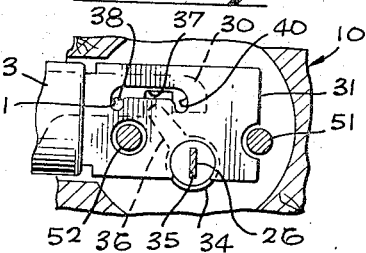
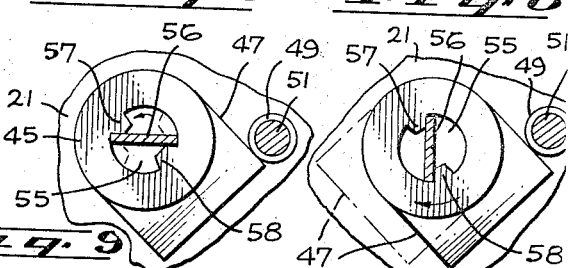
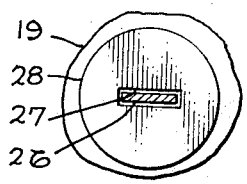
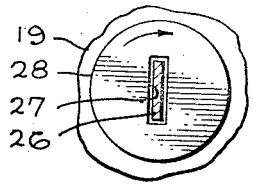
INVENTOR.
FRED J. RUSSELL
BY
Beehler & Arant
ATTORNEYS

3,337,249
TRAILER LOCK
Fred J. Russell, 8635 Otis St.,
South Gate, Calif. 90280
Filed Apr. 4, 1966, Ser. No. 539,793
3 Claims. (Cl. 292—140)

The invention relates to door locks of the kind customarily used on house trailers by virtue of which the door of a house trailer can be locked shut from the outside when it is to be trailed along a highway, the locking being accomplished by throwing an independent dead bolt.

Although house trailers are commonly equipped with the usual type of door locks having handholds or knobs of substantially conventional sorts, styled and sized for trailer use, extra precautions are needed when the trailers are moved on the highway from one location to another.

Among the objects of the invention, therefore, is to provide a new and improved trailer lock which operates independently of the usual conventional door lock on a trailer and which, for all-around safety, can be locked from the outside only but can always be released from the inside.

Another object of the invention is to provide a new and improved trailer lock which is a simple, effective, and rugged auxiliary lock possessed of a relatively small number of parts and which provides for locking on the outside only but provides for release from the inside on all occasions.

Still further among the objects of the invention is to provide a new and improved trailer lock, capable of performing as described, which is positive in action, which is of such size and construction as to be adapted to fit almost any type of trailer door, which requires a minimum amount of space for installation, and which will not become disloged during highway travel.

With these and other objects in view, the invention consists in the construction, arrangement, and combination of the various parts of the device, whereby the objects contemplated are attained, as hereinafter set forth, pointed out in the appended claims, and illustrated in the accompanying drawings.

In the drawings:

FIGURE 1 is an end elevational view of a fragment of door showing showing the trailer lock mounted in operating position;

FIGURE 2 is a fragmentary side elevational view of the outside face of the trailer door taken on the line 2—2 of FIGURE 1;

FIGURE 3 is a longitudinal sectional view taken on the line 3—3 of FIGURE 1;

FIGURE 4 is a fragmentary cross-sectional view taken on the line 4—4 of FIGURE 3;

FIGURE 5 is a fragmentary cross-sectional view similar to FIGURE 4 but showing the position of parts when the latch bolt is extended;

FIGURE 6 is a fragmentary cross-sectional view taken on the line 6—6 of FIGURE 3;

FIGURE 7 is a fragmentary cross-sectional view taken on the line 7—7 of FIGURE 3;

FIGURE 8 is a fragmentary cross-sectional view similar to FIGURE 6 but showing the position of parts when the latch bolt has been extended;

FIGURE 9 is a cross-sectional view similar to FIGURE 7 but showing the position of parts when the latch bolt is extended.

In an embodiment of the invention chosen for the purpose of illustration, there is shown a fragment of conventional trailer door 10 wherein, in the interest of illustrating the environment within which the invention operates, there is shown a substantially conventional door lock indicated by the reference character 11 having an outside knob 12 mounted on an outside face 13 of the door 10, and an inside knob 14 mounted on the inside face 15 of the door 10, in position adapted to manipulate a conventional latch bolt 16.

Adjacent the conventional door lock 11 is the special trailer lock indicated generally by the reference character 17. A fragment of door frame 18 is shown in FIGURES 2 and 3, indicating the door 10 to be in closed position for purposes of illustration.

The trailer lock 17 includes an outside mounting plate 19 on the outside face 13 of the door 10 having an outside handhold 20 rotatably mounted on the outside mounting plate 19. An inside mounting plate 21, with its inside handhold 22 rotatably mounted on it, is attached to the inside face 15 of the door 10. A face plate 23 is attached in conventional fashion to an edge 24 of the door 10, and a dead bolt 25 is adapted to be extended through the face plate 23 when the trailer lock 17 is to be locked into engagement with a retainer plate 29 in the door frame 18.

The trailer lock 17 is of such design and construction that, by operation of a spindle 26, the dead bolt 25 can always be extended to locked position and retracted therefrom by manipulation of the outside handhold 20. To accomplish this, the spindle 26 is of a rectangular cross section, as shown advantageously in FIGURES 7 and 9, and is received in a hole 27 likewise of rectangular cross section in a shank 28 nonrotatably attached to the outside handhold 20.

Extending inwardly from the dead bolt 25 is a tailpiece 30. The tailpiece 30 lies in a space between spaced parallel guide plates 31 and 32 which form a guide for the tailpiece 30. The guide plates 31 and 32 are firmly and stationarily secured to a housing 33 for the dead bolt 25. A bushing 34 is rotatably contained between the guide plate 31 and 32 in axial alignment with the shank 28 of the outside handhold 20 and has extending through it a hole 35 of rectangular cross section through which the spindle 26 extends. In latch bolt operating relationship, a drive arm 36 on the bushing 34 extends into a recess 37 on the tailpiece 30 in driving relationship. Hence, when the outside handhold 20 is rotated in counterclockwise direction, as viewed in FIGURES 2 and 4, the spindle 26 rotates the bushing 34 likewise in counterclockwise direction, swinging the drive arm 36 from the right-hand position of FIGURE 4, wherein the dead bolt 25 is withdrawn, to the left-hand position of FIGURE 5, wherein the dead bolt 25 is extended. A roll-pin 38 fixed to the tailpiece 30 extends laterally outwardly into slots 39 in the respective guide plates 31 and 32. Detent recesses 40 and 41 at respectively opposite ends of each of the slots 39 serve as temporary detents for the roll-pin 38 at opposite limits of its motion. In this way, the dead bolt 25 is yieldably retained in either withdrawn or extended position.

In order that the dead bolt 25 can be withdrawn to unlocked position by the inside handhold 22, but be prevented from being extended to locked position by the inside handhold 22, special construction is incorporated in the device on the inside. A collar 45 is nonrotatably secured to a shank 46 of the inside handhold 22. An arm 47 is in nonrotatable engagement with the collar 45, and a spring washer 48 may be employed to provide a friction resistance against rotation of the inside handhold 22, the spring washer 48 being located between the arm 47 and the inside face of the inside mounting plate 21. Countersinks 49 and 50 extending inwardly from the inside mounting plate 21 receive the heads of mounting bolts 51 and 52 which extend from the inside mounting plate 21 into engagement with appropriate conventional ferrules 53 and 54 on the outside mounting plate 19.

In the collar 45 is a lost motion aperture 55 into which a free end 56 of the spindle 26 extends. Extending into the lost motion aperture 55 are lugs 57 and 58 against which the free end 56 of the spindle 26 is adapted to stop, as shown in FIGURES 6 and 8.

In operation, let it be assumed that the dead bolt 25 is initially in withdrawn position and that in withdrawn position the parts have the positions illustrated in FIGURES 1, 2, 3, 4, 6, and 7. It is important to note that, in order to move the dead bolt 25 to extended position, the spindle 26 and free end 56 must be rotated in a counterclockwise direction, as viewed particularly in FIGURES 2, 4, and 6. Since the arm 47, which is a nonrotatable part of the inside handhold 22, is stopped against the countersink 49 for the mounting bolt 51, as shown in FIGURE 6, the dead bolt 25 cannot be extended even though the lugs 57 and 58, which are on the collar 45, are positioned in drive relationship with respect to the free end 56 of the spindle 26. The spindle 26, however, can be rotated in counterclockwise direction from the position of FIGURES 4 and 6 to the position of FIGURES 5 and 8 by rotation of the outside handhold 20. As the spindle 26 is thus rotated in counterclockwise direction as described, the free end 56 will pass through the lost motion aperture 55 until opposite edges abut opposite lugs 57 and 58, as shown in FIGURE 8. In the chosen embodiment, this is an approximately 90 degree rotation and is sufficient to permit the drive arm 36 of the bushing 34 to shift the dead bolt 25 from withdrawn position to extended position.

It is now possible to withdraw the dead bolt 25 by manipulation of the inside handhold 22. This means rotating the inside handhold 22 and its collar 45 in a clockwise direction from the solid line position of FIGURE 8 to the dotted line position of the arm 47. Rotation to the extent described is sufficient to rotate the free end 56 of the spindle 26 clockwise from the position of FIGURE 8 to the position of FIGURE 6, and to withdraw the dead bolt 25 to unlocked or retracted position. Rotation, as described, returns the tailpiece 30 from the position of FIGURE 5 to the position of FIGURE 4 and, at the same time, rotates the bushing 34 and the outside handhold 20 to their original positions. It will be understood, of course, that the dead bolt 25 can be withdrawn at any time by manipulation of the outside handhold 20 because there is a direct connection through the spindle 26, the bushing 34 and drive arm 36 to the tailpiece 30. Accordingly, the dead bolt 25 can be locked and unlocked at any time from the outside, but though it can be unlocked at any time from the inside, it can never be locked from the inside.

While the invention has herein been shown and described in what is conceived to be most practical and preferred embodiment, it is recognized that departures may be made therefrom within the scope of the invention, which is not to be limited to the details disclosed herein but is to be accorded the full scope of the claims, so as to embrace any and all equivalent devices.

Having described the invention, what is claimed as new in support of Letters Patent is:

1. In a lock for a door, a dead bolt assembly including a housing adapted to be mounted on a door, a dead bolt member reciprocatably mounted in said housing, and actuating means for said dead bolt member including an outside handhold rotatably mounted on the outside of the door and a spindle in nonrotatable engagement respectively with said outside handhold and in operable engagement with said dead bolt member, an inside handhold rotatably mounted on the inside of the door, a stop element on said inside handhold and a complementary stationary stop element having a motion-arresting engagement with said first identified stop element at one position of rotation, said inside handhold having a lost motion engagement with said spindle, said spindle being movable from one end of said lost motion engagement to the other whereby said spindle is in nonrotatable engagement with said inside handhold when said dead bolt is in extended position and said dead bolt is movable to withdrawn position by rotation of said inside handhold, said inside handhold being prevented by engagement of said stop elements from moving said dead bolt to extended position.

2. In a lock for a door, a dead bolt assembly including a housing adapted to be mounted on a door, a dead bolt member reciprocatably mounted in said housing, and actuating means for said dead bolt member including a bushing rotatably mounted on said dead bolt member, a drive element on said bushing, a driven element on said dead bolt member in operable engagement with said drive element, an outside handhold rotatably mounted on the outside of the door and a spindle in nonrotatable engagement respectively with said outside handhold and in operable engagement with said dead bolt member, an inside handhold rotably mounted on the inside of the door, a collar in nonrotational engagement with said inside handhold, a stop element attached to said inside handhold and a stationary stop element having motion-arresting engagement with said first stop element at one position of rotation, said collar having a lost motion aperture therein providing a lost motion engagement with said spindle, said spindle being movable from one end of said lost motion engagement to the other whereby said spindle is in nonrotatable engagement with said collar when said dead bolt is in extended position and said dead bolt is movable to withdrawn position by rotation of said inside handhold, said inside handhold being prevented by engagement of said stationary elements from moving said dead bolt to extended position.

3. In a lock for a door, a dead bolt assembly including a housing adapted to be mounted on a door, a dead bolt having a tailpiece thereon reciprocatably mounted in said housing, a stationary guide on the housing adjacent said tailpiece, and actuating means for said dead bolt including a bushing rotatably mounted on said stationary guide, a drive element on said bushing, a driven element on said tailpiece in operable engagement with said drive element, an outside handhold rotatably mounted on the outside of the door and a spindle in nonrotatable engagement respectively with said outside handhold and said bushing, an inside handhold rotatably mounted on the inside of the door, a collar in nonrotational engagement with said inside handhold, an arm on said collar and a stationary stop having motion-arresting engagement with said arm at one position of rotation, said collar having a lost motion aperture therein providing a lost motion engagement with said spindle, said spindle being movable from one end of said lost motion engagement to the other whereby said spindle is in nonrotatable engagement with said collar when said dead bolt is in extended position and said dead bolt is movable to withdrawn position by rotation of said inside handhold, said inside handhold being prevented by engagement of said arm with said stationary stop from moving said dead bolt to extended position.

References Cited

UNITED STATES PATENTS 1,495,820    5/1924    Tierney.
3,072,427    1/1963    De Vines _____ 292—336.5 X MARVIN A. CHAMPION, *Primary Examiner.*

J. R. MOSES, *Assistant Examiner.*